US011486188B2

(12) United States Patent
Dobbins et al.

(10) Patent No.: US 11,486,188 B2
(45) Date of Patent: Nov. 1, 2022

(54) TAMPER DETECTING AND INVENTORY MONITORING RETAIL SAFE

(71) Applicant: Ellenby Technologies, Inc., Woodbury Heights, NJ (US)

(72) Inventors: Aaron H. Dobbins, Cherry Hill, NJ (US); James M. Henry, Marlton, NJ (US)

(73) Assignee: Ellenby Technologies, Inc., Woodbury Heights, NJ (US)

( * ) Notice: Subject to any disclaimer, the term of this patent is extended or adjusted under 35 U.S.C. 154(b) by 701 days.

(21) Appl. No.: 16/540,648

(22) Filed: Aug. 14, 2019

(65) Prior Publication Data

US 2020/0056418 A1    Feb. 20, 2020

Related U.S. Application Data

(60) Provisional application No. 62/718,672, filed on Aug. 14, 2018.

(51) Int. Cl.
| | |
|---|---|
| *E05G 1/10* | (2006.01) |
| *G06Q 10/08* | (2012.01) |
| *G07C 9/00* | (2020.01) |
| *E05G 1/06* | (2006.01) |
| *E05G 1/04* | (2006.01) |

(52) U.S. Cl.
CPC ............. *E05G 1/10* (2013.01); *E05G 1/06* (2013.01); *G06Q 10/087* (2013.01); *G07C 9/00817* (2013.01); *E05G 1/04* (2013.01)

(58) Field of Classification Search
CPC .... E05G 1/10; E05G 1/06; E05G 1/04; G06Q 10/087; G07C 9/00817
See application file for complete search history.

(56) References Cited

U.S. PATENT DOCUMENTS

| | | | | |
|---|---|---|---|---|
| 5,531,309 | A | * | 7/1996 | Kloss ................. G07F 17/3241 340/5.9 |
| 5,954,576 | A | * | 9/1999 | Coulter ..................... G07F 9/08 177/25.17 |
| 7,142,944 | B2 | | 11/2006 | Holmes et al. |
| 7,516,832 | B2 | | 4/2009 | Dobbins |
| 7,779,983 | B2 | | 8/2010 | Dobbins |

(Continued)

FOREIGN PATENT DOCUMENTS

| | | |
|---|---|---|
| GB | 2307560 A | 5/1997 |
| GB | 2553580 A | 3/2018 |

*Primary Examiner* — Thomas D Alunkal
(74) *Attorney, Agent, or Firm* — Ryan, Mason & Lewis, LLP

(57) ABSTRACT

A secure enclosure is described which is designed to offer inventory management and tamper detection for the storage and removal of rolled coins and other valuable items. Within the secure enclosure a plurality of shelves are provided. Each shelf may have its own scale for the purpose of weighing the contents supported by its shelf. Each shelf may be designed for the storage of one particular denomination of rolled coin. Monitoring circuitry interfaces with the scales for the purpose of determining the quantity of rolls upon each shelf, and the possibility for an erroneous deposit or removal of rolls supported by a shelf or an improper access to other contents on the shelf. A further approach detects multiple types of rolls of coins utilizing a single scale.

19 Claims, 4 Drawing Sheets

(56) References Cited

U.S. PATENT DOCUMENTS

| | | | |
|---|---|---|---|
| 8,175,746 B2* | 5/2012 | Godlewski | G07F 11/62 |
| | | | 700/242 |
| 9,532,666 B2 | 1/2017 | Savage et al. | |
| 9,557,209 B2 | 1/2017 | Savage et al. | |
| 9,984,355 B2* | 5/2018 | Jones | G06Q 10/087 |
| 2002/0063034 A1 | 5/2002 | Dobbins | |
| 2005/0077352 A1* | 4/2005 | Gudbjartsson | G06Q 10/087 |
| | | | 235/385 |
| 2005/0205654 A1* | 9/2005 | Carter | G06Q 10/087 |
| | | | 235/7 R |
| 2011/0011927 A1 | 1/2011 | Dobbins | |
| 2011/0279225 A1 | 11/2011 | Frontino et al. | |
| 2014/0297487 A1* | 10/2014 | Bashkin | A47B 96/02 |
| | | | 705/28 |
| 2016/0110939 A1 | 4/2016 | Dobbins et al. | |
| 2016/0239802 A1* | 8/2016 | Burch, V | G06Q 10/0833 |
| 2019/0304263 A1* | 10/2019 | Bacallao | G07G 1/0027 |

* cited by examiner

TAMPER DETECTING AND INVENTORY MONITORING RETAIL SAFE

The present application claims the benefit of U.S. Provisional Application Ser. No. 62/718,672 filed Aug. 14, 2018 which is incorporated by reference in its entirety herein.

FIELD OF THE INVENTION

The present invention relates generally to improved aspects of a tamper detecting and inventory monitoring retail safe, and more particularly to advantageous aspects of a scale system and monitoring circuitry to monitor an inventory of rolled coins or the like.

BACKGROUND OF THE INVENTION

A wide variety of scale and storage systems exist, such as those described in U.S. Pat. No. 9,557,209 addressing a load cell bin system; U.S. Pat. No. 9,532,666 addressing a modular storage system; U.S. Pat. No. 7,142,944 addressing an apparatus for securing drawer contents; U.S. Pat. No. 5,954,576 addressing a coin hopper with preventative fill detector and automatic inventorying; U.S. Pat. No. 8,175,746 addressing a weight-based dispensing system; U.S. Pat. No. 9,984,355 addressing systems and methods for monitoring location of products on shelves at a retail sales facility; G.B. 2,307,560A addressing a shelf bar using weighing for central billing; and G.B. 201615490D0 addressing a cash drawer unit or cash register and methods of operation therefor, for example.

SUMMARY OF THE INVENTION

One aspect of the present invention addresses a storage safe having a single coin vault door that is electronically locked. Access to this door is controlled by a smart safe user input such as a keypad. Inside the coin vault there are preferably four shelves, one for each of the common United States coin denominations, namely pennies, nickels, dimes, and quarters. It will be recognized that it is possible to add shelves to handle additional denominations or employ shelves to hold other valuables as addressed further below.

On the top of each shelf, there is a scale designed to monitor the weight of the rolls of coins placed on that shelf. A controller which is preferably in the smart safe is pre-programmed or otherwise trained with the weight of a standard roll of each denomination of coin and calculates the number of rolls on each shelf as follows in Equation 1:

Number of Rolls=(Total weight on scale of the shelf−Weight of any container(s) in which rolls placed)/Standard weight of one roll intended for that shelf During loading time, a store manager or coin delivery person opens the coin vault door by entering appropriate credentials into the safe interface. The manager then specifies the nature of the container used to constrain the rolls of coins, if any. The manager also specifies how many containers are being added to each shelf, for example, two boxes. Typical containers include a cardboard box and a plastic tray designed specifically for retail rolled coin storage. These standard container weights can be preprogrammed into the controller and be selectable from a drop list on a user interface. Alternatively, the manager can perform a "tare" function after placing the container into the shelf empty prior to loading it with coin rolls.

In another embodiment of coin roll loading, the manager enters the number of rolls added and allows the controller to calibrate the roll weights from the entered value and measured total weight. For example, the manager opens the safe and places a full bank box of 50 rolls of quarters on the quarter shelf. Then, the manager enters into the interface that 50 rolls have been added. The controller then performs the following calculation in Equation 2:

Weight Per New Roll=(New Shelf Weight−Old Shelf Weight−Box Packaging Weight)/(50 added rolls)

The controller then performs a check on the calculated weight per new roll compared to the known weight of a standard roll on that shelf to ensure rolls added are legitimate. Using this second method, the standard weight per roll can be trained to the newly calibrated value of weight per roll as long as it is substantially close to the previously understood weight per roll. If the new weight per roll measurement is not sufficiently close to the previous one, the roll coin deposit is rejected by way of an indication on the display. This rejection may occur, for example, if the manager inadvertently places a box of dimes instead of quarters on the quarter shelf, or if the box of quarters is a partial box, rather than a full box.

Removal of coin rolls from the safe can be performed by managers and optionally by cashiers. The value of coin product removed can be set unique by each user or user type. There may be other preconditions for allowing the removal of coin rolls such as only during particular windows of time during the day or certain days during the week.

During a coin removal, the controller continually monitors the shelf scales and records both steady-state adjustments to the weight on each shelf as well as any transients on the scales which are indicative of manipulation of coin rolls or other activity on the shelf.

One such type of manipulation detectable by the controller would be the removal of a roll of coins such as a roll of quarters from the quarter shelf, and then the subsequent replacement of a dummy weight approximating the weight of a roll of quarters on that shelf. The resulting sampled weights would reflect the removal of the roll of quarters, approximately 0.225 kg, and then an addition of a similar weight. It appears unlikely the addition would be identical. These dips or unexpected increases in weight are flagged by the controller as anomalous events and are recorded electronically alongside the user identity. For additional security, the safe operates in a mode where rolled coin deposits are prohibited during a rolled coin removal activity. Thereby ensuring that lower privilege level users, such as cashiers, are only empowered to remove coin rolls from the shelves and only privileged users, such as managers, are entrusted to place proper full rolls of currency onto a shelf. This restriction avoids the ability of the cashier to add value to the storage safe by adding weight and thereby potentially fool the safe into believing it has additional rolls of quarters with the addition of an equivalent weight to then steal actual rolls of quarters at a later point in time.

While the coin vault is closed and locked, the controller continually monitors the weight of each shelf. No substantial change in weight or transients in the weight measurements should be recorded. If any changes are detected above a particular threshold, the controller will log a tamper event. Such tamper events can be communicated out to a monitoring service through the use of a cellular network, Ethernet connection, or other communication approach to alert management of a problem. Additionally, such tamper events can be wired to a local security system or vault security system which would prompt sirens, strobe lighting, smoke systems, or the like.

While the above discussion of the invention has been primarily in the context of inventory management and tamper detection methods as they relate to rolled coins, the technology can be adapted for other valuables within a retail store. One such example would be cash tills. A manager may desire to place one or more cash tills per shelf. In one example, the manager places one till in each shelf at the end of a shift for a store that has four cash registers. The scales weigh the contents of the till when placed in the safe at the end of a shift and the controller ensures the tills remain untampered with until they are removed at the start of the next shift.

Another example of valuables that may advantageously benefit from storage utilizing this technology in retail is the tracking of loose note change orders, typically in the form of 1's, 5's, and 10 dollar bills used to help retailers break larger bills received from customers. These notes can be bundled in clear plastic tubes and placed on one of the shelves as disclosed to track the deposit and removal of change order note bundles. Alternatively, change order notes can be placed in a separate compartment with a scale calibrated to measure smaller weights and tuned for individual note resolution. The quantity of notes in that compartment can be tracked in much the same fashion as disclosed for rolled coin products. In yet a third alternative, it may be advantageous to offer a fifth storage compartment at the top of the safe without any scales for the storage of miscellaneous valuables for safe keeping. Such a compartment would be useful for storing loose change, order notes, checks, coupons, receipts, high value items, and the like.

In a retail environment, the vault containing change funds may advantageously be placed in a back room with restricted access for additional security. Electronic deposit management equipment such as smart safes, such as those listed in the Detailed Description of the invention below, may exist right behind the counter and used to safeguard funds received by customers. The deposit smart safe is configured to accept paper currency, validate the currency and safeguard that currency until a point in time when the vault door is opened by a designated person. This smart safe can also be programmed with a special "pay for change" mode where cashiers or managers can insert funds in paper currency into the smart safe to pay for the change they wish to remove from the change fund vault. This behavior will be described in further detail below in connection with discussion of FIG. 3. Information concerning the payments made for change order funds can be communicated from the smart safe to the change fund vault preferably over a wireless link so that no additional costly wiring infrastructure is needed in the store. The wireless link is preferably a high security encrypted link and is Bluetooth Low Energy compliant. The change fund vault also preferably communicates back to the smart safe using the same link when it has a deposit or retrieval event occur. Other wireless or hard-wired links can also be used to communicate information between the two pieces of equipment.

The wireless radio on the change fund vault also allows for a variety of user interfaces to initiate a removal or deposit. In the first case, the smart safe keypad, located remotely from the change fund vault, can be used as a user input. In a second case, a tablet or smart phone with the same radio can be configured to operate as a terminal device to communicate with the change fund vault.

Several advantages of this described system are:
Rolled coin inventory tracking which can be kept local to the safe or networked to a managed service portal for the purpose of reordering of inventory
Ability to track coin usage by user log in
   Ability to apply value limits based on user id
   Ability to apply value limits based on cash funds deposited into the smart safe associated with the coin vault
Reduction of the amount of time to count and safeguard coin rolls when replenishing the vault
   Ability to use the same packaging the coin was delivered in Comprehensive tamper coverage of all coin inventory while the safe is locked and secured
Tracking of anomalous behavior during rolled coin removals
Access control for who can access coin inventory and during what times
Ability to interface to the coin vault via a remotely located smart safe keypad or a radio-equipment smart device, such as a smart phone or tablet.

A more complete understanding of the present invention, as well as, further features and advantages of the invention will be apparent from the following Detailed Description and the accompanying drawings.

DETAILED DESCRIPTION

Figure 1:
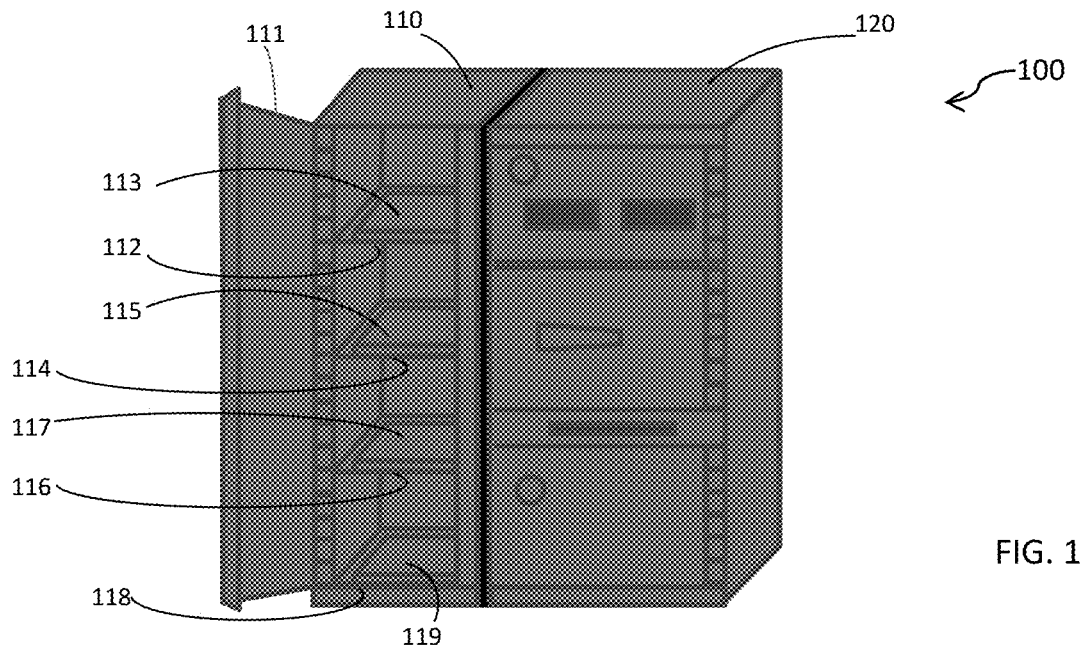
FIG. 1 shows a presently preferred embodiment of the present invention in which a tamper detecting and inventory monitoring retail safe in accordance with the present invention is implemented in conjunction with an electronic drop safe.

FIG. 1 shows a presently preferred embodiment of a tamper detecting and inventory monitoring retail safe 100 in accordance with the present invention. As shown in FIG. 1, the safe 100 comprises a coin storage safe 110 which is a peripheral or add on to an existing electronic drop safe 120 modified in accordance with the teachings of the present invention. Coin storage safe 110 has four shelves 112, 114, 116 and 118 each having its own scale 113, 115, 117 and 119, respectively. Scale 113 may suitably be a penny scale, scale 115 may suitably be a nickel scale, scale 117 may suitably be a dime scale and scale 119 may suitably be a quarter scale.

Figure 2:
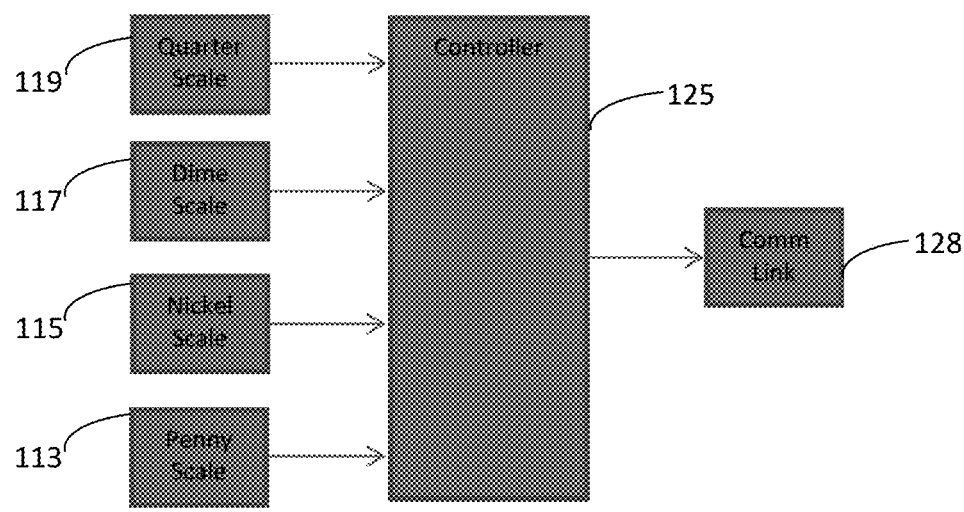
FIG. 2 shows a block diagram of four scales from the retail safe of FIG. 1 communicating with a controller of the electronic drop safe.

As seen in FIG. 2, each of the scales 113, 115, and 117 and 119 communicates its weigh signals to a controller which is preferably the controller 125 of the coin storage safe 110 which has been programmed to interpret the inventory levels within the safe, managing deposits, removals, and security of the inventory, and to report this information to a smart safe controller housed within smart safe 120. For examples of electronic drop safe functions, see U.S. Patent Application Publication Nos. 2002/0063034; 2011/0279225; 2011/0011927; 2016/00110939 and U.S. Pat. Nos. 7,516,832; and 7,779,983; all of which are assigned to the assignee of the present invention and incorporated by reference herein in their entirety.

Controller 125 utilizes a communication link 128 to communicate with an electronic drop safe 120 as addressed further herein. This link can be in the form of a hardwired serial link such as RS485 or RS232 when located in close proximity to the electronic safe. If the coin storage safe 110 is located remotely from the electronic drop safe 120, the communication link is preferably a wireless two way radio in the form of Bluetooth or WiFi. While a standalone coin storage safe 110 with full electronics can be built consistent with the teachings herein, the piggy backing of the coin storage safe 110 on the existing electronic drop safe 120 modified as taught herein presents a low cost alternative that advantageously builds on a product often found in environments where change coins are required and an inventory of cash on hand must be maintained.

Figure 3:
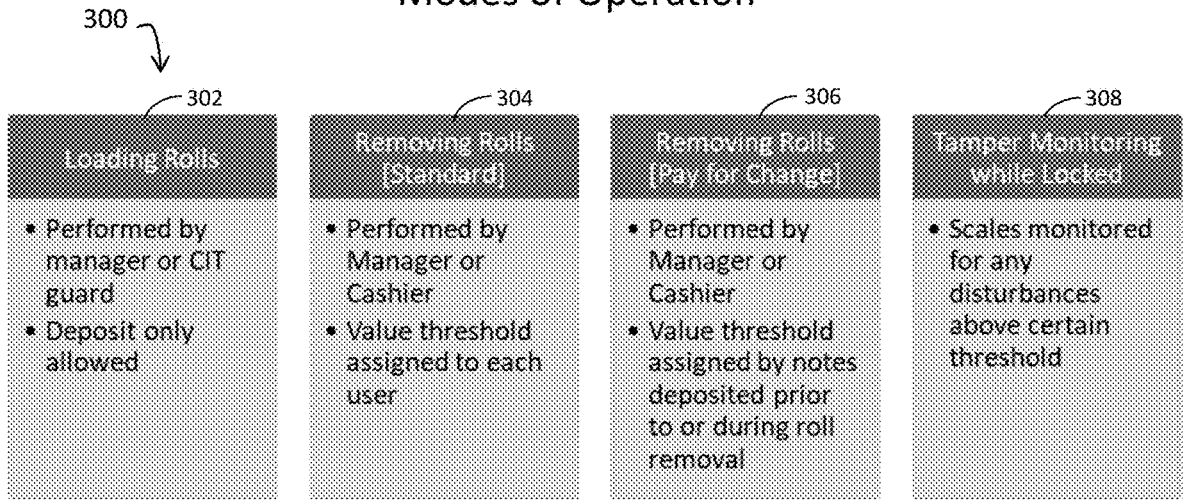
FIG. 3 shows a table of modes of operation for one embodiment of the present invention.

FIG. 3 shows a modes of operation table 300 illustrating several presently preferred modes including loading rolls 302, removing rolls [standard] 304, removing rolls [pay for change] 306 and tamper monitoring while locked 308.

Figure 6:
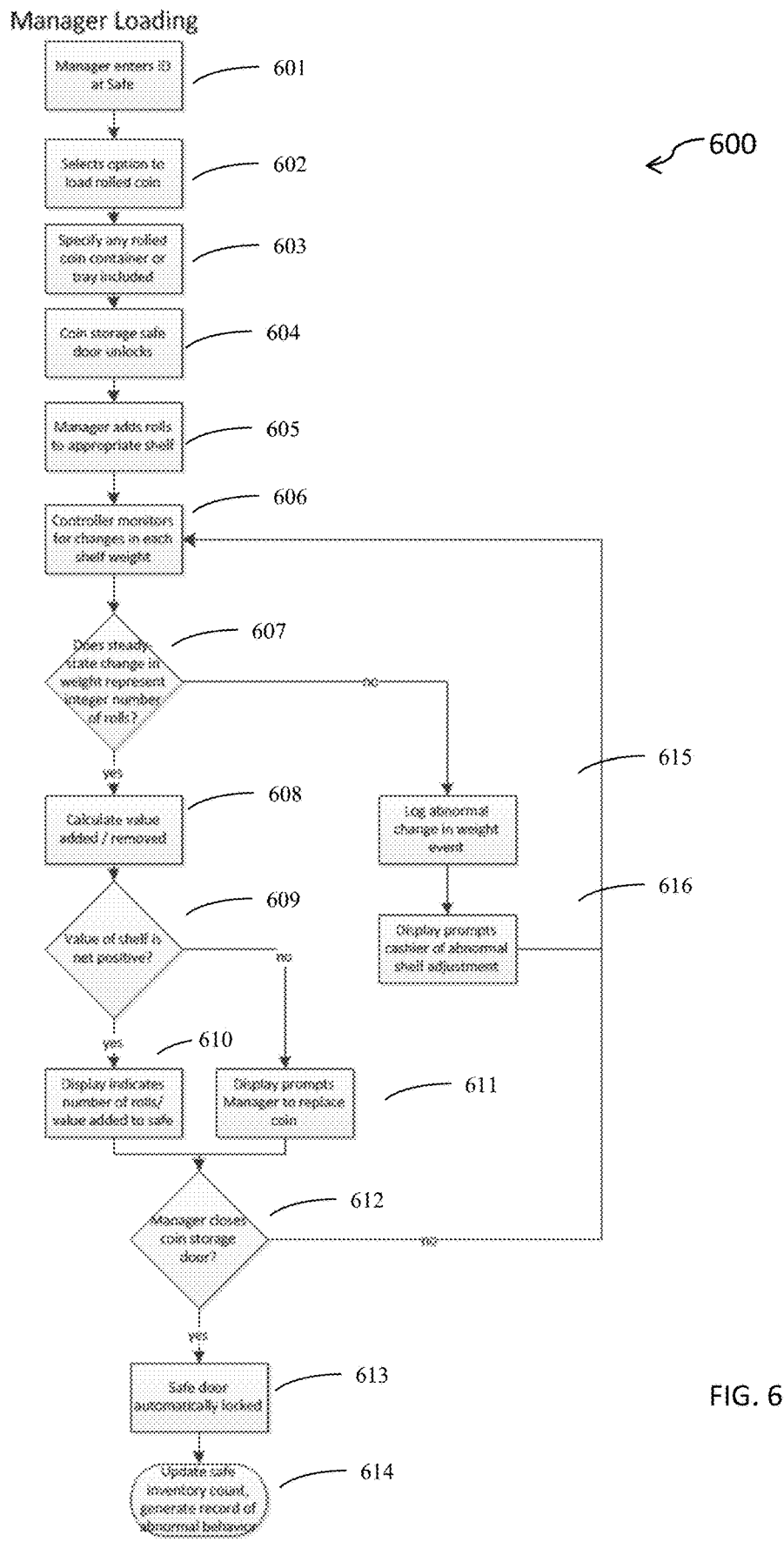
FIG. 6 shows a method of monitoring a manager loading rolled coins in accordance with the present invention.

When loading rolls 302, the manager or Cash in Transit (CIT) guard first authenticates himself or herself with the user interface to access the interior of the coin storage safe and selects the activity of loading rolled coin as seen in steps 601 and 602 of FIG. 6 which shows a manager loading process 600 in accordance with the present invention. The properly authenticated user then proceeds to specify if the coin is being loaded with any standard container types in 603. A standard container type may be a rolled coin cardboard box or aluminum tray, for example. The weights of these containers are stored in the controller's memory and will be used to calculate the number of rolls added. The user opens the change safe door and adds the rolled coin inventory inclusive of the selected container type to the appropriate scale in steps 604 and 605. While the door is open, the controller is constantly monitoring the scales looking for the addition of weight in step 606. Calculation of the number of rolls added and their corresponding value occurs in step 607 employing Equation 1 above. In step 608, if the weight change measured on any given scale is consistent with the addition of an integer number of rolls when corrected for the container weight, and the change in weight is positive as determined in step 609, then the user interface will provide an update to reflect the number of rolls added to the safe in step 610. If instead, the calculated value from step 607 represents a net removal of an integer number of rolls, the display will prompt the user to replace any coin rolls removed and an event will be logged in step 611. If the manager closes the door in step 612, the safe then automatically locks in step 613 and the controller updates the inventory count as well as logging any abnormal activities or alerts detected during the loading process by signalling such activity over the communication interface 125 in step 614. If instead the user does not close the door in step 612, the controller continues to monitor the scales for changes in weight in step 606.

One such type of anomaly communicated at the end of the coin roll loading process would be if any rolls were removed during this loading activity detected in step 611. Another such type of anomaly would be if the scales ever record a change in weight that does not correspond to an integer number of rolls as determined in step 615. That type of anomaly would be indicative of someone loading a partial roll of coins or potentially the wrong type of roll onto a shelf. For instance, loading a nickel roll on a designated dime shelf scale. In this case, the user would also be prompted to correct the error when it occurs by the user interface in step 616.

Whereas the above discussion details the routine of replenishing the inventory by a preferred method of automatically calculating the number of rolls of coins placed on a scale following Equation 1, it is also possible to operate in a mode where the user enters the intended number of rolls to be added and thereby calibrate the scales' detected change in weight based on that trusted number of rolls as exemplified in Equation 2.

The removing rolls modes of operation 304 and 306 of FIG. 3 anticipate a user who may be restricted to only be allowed to remove rolls from the inventory. The change controller 125 need only monitor for net decreases in the weight of each shelf and does not need to account for scenarios in which some products are added and some products removed during the same transaction. This restriction to removing coin only enhances the controller's ability to make an accurate determination of the number of rolls removed since there are no offsetting weight additions to the trays. The number of total rolls removed prior to an alert being generated is a function of either a preset value threshold in mode 304 or an offsetting deposit of funds in pay for change mode 306. One such method of paying for the rolled coin change would be through a currency deposit using a co-located smart deposit safe 120 and communicated to the controller using communication link 128. Other electronic pay for change methods would be equally suitable and can be communicated to the safe controller using the same communication link.

Figure 5:
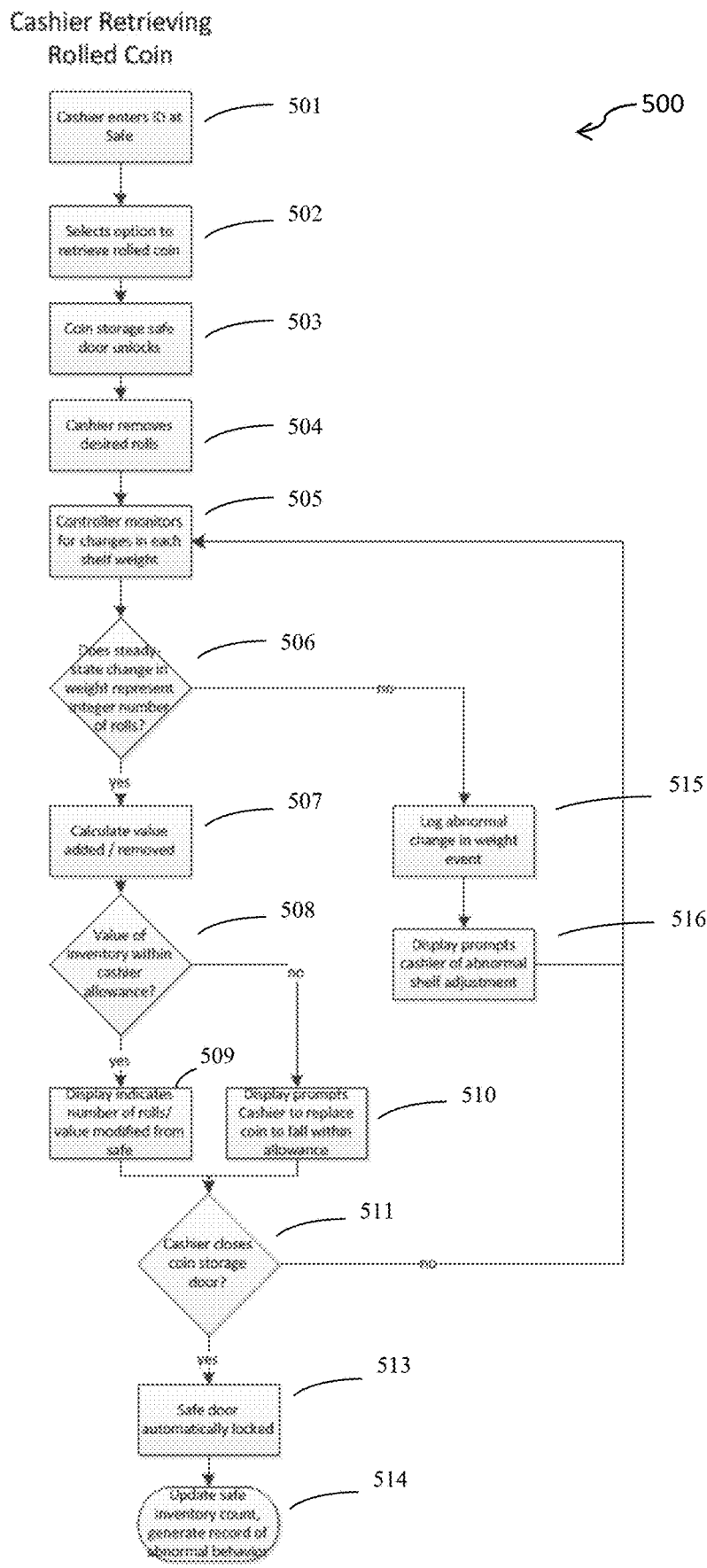
FIG. 5 shows a method of monitoring a cashier retrieving rolled coins in accordance with an embodiment of the present invention.

FIG. 5 shows a process 500 of monitoring a cashier retrieving rolled coins in accordance with the present invention. In step 501, the cashier enters his or her credentials into the user interface. Then, the activity of removing rolls of coins is selected in step 502. The safe door unlocks to permit access to the inventory in step 503. The cashier takes desired rolls in step 504 according to either the pay for change model or the threshold limit model discussed above. The controller detects the change in weight on one or more scales according to which inventory was removed in step 505 following Equation 3:

Rolls removed=(initial steady state scale reading prior to removal activity−new steady state scale reading)/Weight per roll as designated for that scale If the result of the above calculation represents an integer number of rolls as determined in step 506, then the controller proceeds to conclude the number of rolls added or removed in step 507. Assuming a net number of rolls is removed, then the value is calculated to determine if that value is within the cashier's authority in step 508 based on either of the discussed modes 304 or 305. If within the allowance, the user interface is updated to reflect the number of rolls removed so far in step 509. If not, the user interface prompts the cashier to replace rolls in step 510. In step 511, if the cashier is finished retrieving rolls, the door is shut and then automatically locked in step 513. If not finished with removing inventory, the cashier proceeds to remove additional rolls of coins and the controller continues monitoring the scales in step 505 for as long as the door remains open.

Once the door is closed and locked, the activity of removing inventory is complete. The controller updates the inventory count in step 514 and reports any anomalous activity. Anomalous activity includes any net additions of coin rolls that may have occurred during the retrieval transaction, any amounts taken in excess of the maximum allowed amount in step 510, or any partial coin roll weights removed as determined in step 515. In the case of a partial roll removal, there is also a user interface prompt at the time of the detected partial removal in step 516.

When the coin storage safe is locked, its controller goes into a tamper monitoring mode 308 as illustrated in FIG. 3. In this scenario, any changes to the scales weights above a minimum threshold are electronically recorded and communicated out of the safe communication link 128. Such events can be used to trigger security alerts to a connected security system or directly to a web services monitoring platform. The minimum threshold for detection is preferably a change of weight equivalent to more than half of the nominal inventory unit weight for which that scale is measuring or about 100 grams for a nickel scale, for example. Scales are monitored for both decreases in weight or increases in weight as both may be the result of tampering or manipulation of inventory.

Figure 4:
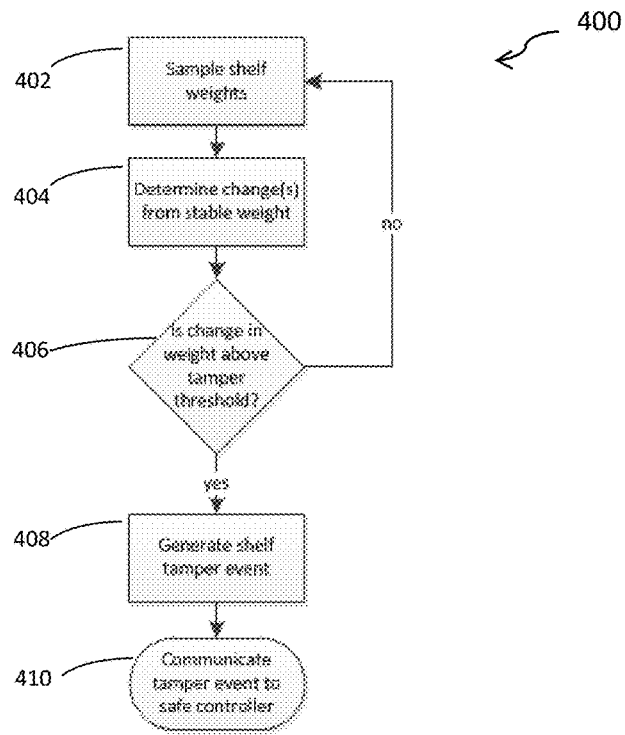
FIG. 4 shows an outer door closed and locked tamper detection process in accordance with an embodiment of the present invention.

FIG. 4 shows a process 400 for detecting tampering when outer door 111 of coin storage safe 110 is closed and locked and the storage safe is operating in the tamper monitoring mode 308 of FIG. 3. In step 402, a controller such as the controller 125 samples shelf weight signals from the scales 113, 115, 117 and 119 on an ongoing basis. In step 404, it is determined by the controller 125 for any detected change, what the change is from the stable steady state weight. In step 406, it is determined if the change is above a predetermined tamper threshold. If no, the process 400 cycles back up to step 402. If yes, a shelf tamper event is generated in step 408. For example, a timestamp and the nature of the tamper event are recorded. In step 410, the tamper event is communicated to the safe controller in electronic deposit safe 120 utilizing communication link 128.

One variant of the preferred embodiment rolled coin change safe is to use a fewer number of scales than the number of denominations of rolled coins being used. For example, a single scale can be used to measure the weight of all rolled coin types such as pennies, nickels, quarters, and dimes. The use of a single scale reduces the system cost and could result in a smaller storage compartment than a safe designed for four separate storage compartments. The ability to calculate the number of rolls added or removed is a bit of a compromise, however. This compromise is due to the fact that multiple rolls of one coin type may weigh nearly identically to different multiple of rolls of a second coin type. For example, two rolls of dimes weigh just about the same as one roll of quarters and eight rolls of pennies weights about the same as five rolls of nickels. To get around some of these inventory tracking ambiguities, one solution is to only permit adding or removing one roll of coins at a time. By limiting the scale difference calculation to that of a single roll of coins, there is sufficient separation in the weights of roll types for the controller to conclude with a high level of accuracy which roll was removed or added to the inventory. A second less secure but more convenient method would be to require users to specify how many rolls they are removing or replacing and then having the controller check the change in inventory weight based on that input.

The approach of using a single scale to identify multiple different types of products can be further broadened to detect the presence or removal of other objects of value such as deposit bags full of cash. Upon deposit of such a deposit bag onto the scale, the controller stores the increase of weight associated with that particular bag. Upon removal of the bag, the controller seeks to match a detected removed weight with the previously deposited recorded weight value for the bag.

While the present invention has been disclosed in the context of presently preferred embodiments and environments, it will be recognized that it can be modified consistent with the demands of other environments and contexts consistent with the teachings herein and the claims which follow.

We claim:

1. A tamper detecting and inventory monitoring retail safe comprising:
   a coin storage safe comprising a plurality of shelves;
   means for weighing valuables placed upon each of the plurality of shelves on an ongoing basis and producing weigh signals
   means for evaluating said weigh signals for changes to determine if a tampering event has occurred;
   means for evaluating said weigh signals for changes to monitor changes in inventory events of said valuables; and
   means for recording and reporting tampering events and changes in inventory events.

2. The retail safe of claim 1 wherein said valuables comprise coin rolls and the plurality of shelves comprise four shelves one for pennies, one for nickels, one for dimes and one for quarters.

3. The retail safe of claim 2 wherein said means for weighing valuables comprises a scale for each of the four shelves.

4. The retail safe of claim 1 wherein the means for evaluating comprises a programmed processor.

5. The retail safe of claim 4 wherein the programmed processor communicates with an electronic drop safe.

6. The retail safe of claim 1 wherein the means for recording and reporting tampering events and change in inventory events timestamps said events.

7. The retail safe of claim 1 further comprising: an electronic door lock controlled by said programmed processor.

8. A method of monitoring rolled coins in a secure storage safe having an inventory of rolled coins, the method comprising:
   identifying a first authorized user having authority to remove coins from the secure storage safe;
   opening an access door of the secure storage space;
   detecting any reduction in weight from a compartment equipped with a weight scale;
   calculating a number of removed rolls of coins corresponding to each detected reduction in weight;
   closing the access door; and
   adjusting the inventory of rolled coins to reflect the number of removed rolls of coins.

9. The method of claim 8 further comprising:
   identifying a second authorized user having authority to add rolled coins to the secure storage safe;
   opening the access door of the secure storage space;
   detecting any increase in weight from the compartment equipped with a weight scale;
   calculating a number of added rolls of coins corresponding to each detected increase in weight;
   closing the access door; and
   adjusting the inventory of rolled coins to reflect the number of added roles of coins.

10. The method of claim 8 wherein the first authorized user has authority to remove a predetermined number of rolls of rolled coins from the secure storage safe, the method further comprising:
reporting an anomaly if the calculated number of removed rolls of coins exceeds the predetermined number, or if any increase in weight is detected for the compartment equipped with a weight scale.

11. The method of claim 8 further comprising:
entering by the first authorized user a number of rolls of rolled coins to be removed prior to opening the access door.

12. The method of claim 11 further comprising:
reporting an anomaly if the calculated number of removed rolls of coins does not correspond to the predetermined number.

13. The method of claim 9 further comprising:
entering by the second authorized user a number of rolls of rolled coins to be added and a weight of any packaging or container to be added with said number of rolls.

14. The method of claim 13 further comprising:
reporting an anomaly if the calculated number of added rolls coins does not correspond to the predetermined number.

15. The method of claim 9 further comprising:
determining if any partial rolls of coins were removed or added; and
reporting said determination.

16. The method of claim 8 further comprising:
utilizing one compartment with a weight scale for each of plural coin types to be stored in the inventory of rolled coins.

17. The method of claim 8 further comprising:
paying for any removed coin rolls.

18. The method of claim 10 further comprising:
prompting the first user to return any excess number of removed rolls exceeding the predetermined number.

19. A tamper detecting and inventory monitoring retail safe comprising:
a bank bag storage safe comprising at least one compartment with a weight scale, the weight scale weighing a bank bag upon insertion and removal of the bank bag into the compartment to measure changes in weight as the bank bag is placed in and removed from the at least one compartment on an ongoing basis and producing weigh signals;
an interface utilized to enter identifying information for a bank bag by an authorized user;
a memory storing said weight and identifying information for the bank bag together;
means for evaluating said changes in weight to determine if a tampering event has occurred;
means for evaluating said changes in weight to monitor changes in inventory of bank bags; and
means for recording and reporting tampering events and changes in inventory.

* * * * *